United States Patent

Shimizu (10) Patent No.: US 10,515,031 B2
(45) Date of Patent: Dec. 24, 2019

(54) MEMORY DEVICE AND DATA PROCESSING DEVICE

(71) Applicant: Toshiba Memory Corporation, Minato-ku, Tokyo (JP)

(72) Inventor: Naoki Shimizu, Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 0 days.

(21) Appl. No.: 15/914,719

(22) Filed: Mar. 7, 2018

(65) Prior Publication Data

US 2019/0065414 A1 Feb. 28, 2019

(30) Foreign Application Priority Data

Aug. 31, 2017 (JP) ................................. 2017-167201

(51) Int. Cl.
*G06F 13/16* (2006.01)
*G06F 12/02* (2006.01)
*G06F 13/40* (2006.01)

(52) U.S. Cl.
CPC .......... *G06F 13/1678* (2013.01); *G06F 12/02* (2013.01); *G06F 13/4068* (2013.01); *G06F 2212/202* (2013.01)

(58) Field of Classification Search
CPC ... G06F 12/02; G06F 13/1678; G06F 13/4068
See application file for complete search history.

(56) References Cited

U.S. PATENT DOCUMENTS

| 9,042,198 | B2* | 5/2015 | Shirai ...................... G11C 7/12 365/230.03 |
| 10,162,406 | B1* | 12/2018 | Mazumder .............. G06F 3/002 |
| 2005/0125596 | A1* | 6/2005 | Yap ...................... G06F 13/4243 711/105 |
| 2011/0016278 | A1* | 1/2011 | Ware ................... G06F 13/1684 711/148 |
| 2015/0317096 | A1* | 11/2015 | Bains .................. G11C 7/1057 711/167 |
| 2015/0371688 | A1* | 12/2015 | Pekny ................. G06F 13/1694 711/105 |

FOREIGN PATENT DOCUMENTS

WO    WO 2014143056 A1    9/2014

* cited by examiner

*Primary Examiner* — Henry Tsai
*Assistant Examiner* — Christopher A. Daley
(74) *Attorney, Agent, or Firm* — Foley & Lardner LLP

(57) ABSTRACT

According to one embodiment, a memory device includes one or more semiconductor devices connected in common to a bus. Each of the one or more semiconductor devices includes a memory unit to store data, and an input/output control unit. The input/output control unit is configured to acquire address information from a data processing device via the bus and access the memory unit according to the acquired address information. The data processing device is configured to divide the address information into a plurality of cycles to transmit to the bus. The input/output control unit is configured to switch a number of cycles in which the address information is to be acquired, according to setting information acquired from the data processing device.

14 Claims, 7 Drawing Sheets

| Cycle | I/O7 | I/O6 | I/O5 | I/O4 | I/O3 | I/O2 | I/O1 | I/O0 | |
|---|---|---|---|---|---|---|---|---|---|
| 1st | CA7 | CA6 | CA5 | CA4 | CA3 | CA2 | CA1 | CA0 | |
| 2nd | X | X | X | X | CA11 | CA10 | CA9 | CA8 | |
| 3rd | PA6 | PA5 | PA4 | PA3 | PA2 | PA1 | PA0 | MC | MC=0 / MC=1 |
| 4th | PA14 | PA13 | PA12 | PA11 | PA10 | PA9 | PA8 | PA7 | |
| 5th | PA22 | PA21 | PA20 | PA19 | PA18 | PA17 | PA16 | PA15 | |
| 6th | X | X | X | X | X | X | PA24 | PA23 | |

FIG.8

| IDENTIFI-CATION VALUE | CHIP ADDRESS [2:0] | | |
|---|---|---|---|
| | CADD2 | CADD1 | CADD0 |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

| Cycle | I/O7 | I/O6 | I/O5 | I/O4 | I/O3 | I/O2 | I/O1 | I/O0 |
|---|---|---|---|---|---|---|---|---|
| 1st | CA7 | CA6 | CA5 | CA4 | CA3 | CA2 | CA1 | CA0 |
| 2nd | X | X | X | X | CA11 | CA10 | CA9 | CA8 |
| 3rd | PA7 | PA6 | PA5 | PA4 | PA3 | PA2 | PA1 | PA0 |
| 4th | PA15 | PA14 | PA13 | PA12 | PA11 | PA10 | PA9 | PA8 |
| 5th | PA23 | PA22 | PA21 | PA20 | PA19 | PA18 | PA17 | PA16 |
| 6th | X | X | X | X | X | X | PA25 | PA24 |

PA23 is X if SETTING INFORMATION=0

MEMORY DEVICE AND DATA PROCESSING DEVICE

CROSS-REFERENCE TO RELATED APPLICATIONS

This application is based upon and claims the benefit of priority from Japanese Patent Application No. 2017-167201, filed on Aug. 31, 2017; the entire contents of which are incorporated herein by reference.

FIELD

Embodiments described herein relate generally to a memory device and a data processing device.

BACKGROUND

Data processing devices such as central processing units (CPUs), when accessing a nonvolatile memory device, transmit a command and then transmit address information over a predetermined number of cycles. In these years, as the capacity of the nonvolatile memory device is increasing, address information is increasing in size.

Nonvolatile memory devices (Multi-Dies) including multiple semiconductor chips are known. When accessing the nonvolatile memory device including multiple semiconductor chips, a CPU transmits address information including information to select a chip (a chip address). The chip address is, for example, three bits of information and can identify eight chips. When the chip address included in the address information coincides with its own identification value, each semiconductor chip performs data write or read or so on. On the other hand, when the chip address included in the address information does not coincide with its own identification value, each semiconductor chip does not perform data write nor read nor so on.

The nonvolatile memory device can be configured to include only one semiconductor chip. In this case, when receiving address information, the semiconductor chip performs data write or read or so on every time without referring to the chip address.

However, the CPU transmits address information including a chip address regardless of whether the nonvolatile memory device is configured to include only one semiconductor chip or multiple ones. Thus, in a system using the nonvolatile memory device configured to include only one semiconductor chip, the CPU has to transmit address information including a chip address, although the chip address is not used. Further, the semiconductor chip may have to perform an extra acquisition process for the unused chip address.

DETAILED DESCRIPTION

In general, according to one embodiment, a memory device including one or more semiconductor devices connected in common to a bus is provided. Each of the one or more semiconductor devices includes a memory unit to store data; and an input/output control unit. The input/output control unit is configured to acquire address information from a data processing device via the bus and access the memory unit according to the acquired address information. The data processing device is configured to divide the address information into a plurality of cycles to transmit to the bus. The input/output control unit is configured to switch a number of cycles in which the address information is to be acquired, according to setting information acquired from the data processing device.

A memory device 30 and a data processing device 20 according to embodiments will be described in detail below with reference to the accompanying drawings. The present invention is not limited to these embodiments.

First Embodiment

Figure 1:
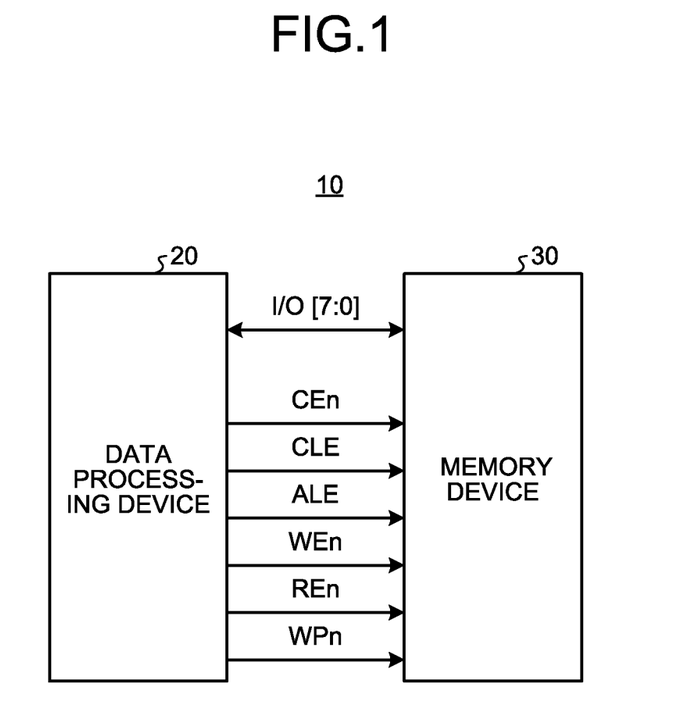
FIG. 1 is a block diagram illustrating the configuration of an information processing device.

FIG. 1 is a block diagram illustrating the configuration of an information processing device 10.

The information processing device 10 comprises the data processing device 20 and the memory device 30. The data processing device 20 is a processing circuit such as a CPU. The data processing device 20 may be another device, not being limited to a CPU, as long as the device can access the memory device 30.

The memory device 30 is a storage to store data and accessed by the data processing device 20. The memory device 30 incorporates one or more semiconductor chips of the same type in its package.

The data processing device 20 and the memory device 30 are connected via a bus (I/O[7:0]). The data processing device 20 transmits commands and address information to the memory device 30 via the bus. Further, the data processing device 20 and the memory device 30 transmit and receive data via the bus. In this example, the bus is eight bits wide but, not being limited to the eight bit width, may have another bit width.

The data processing device 20, after transmitting a command, transmits address information designating the area to access through the command to the bus. In this case, the data processing device 20 divides the address information temporally into multiple cycles to transmit to the bus.

Further, the data processing device 20 transmits various control signals to the memory device 30 via corresponding dedicated lines. For example, the data processing device 20 transmits a chip enable signal (CEn), a command latch enable signal (CLE), an address latch enable signal (ALE), a write enable signal (WEn), a read enable signal (REn), and a write protect signal (WPn) to the memory device 30. The data processing device 20 may transmit control signals other than these to the memory device 30.

The information processing device 10 may comprise a control logic circuit between the data processing device 20 and the memory device 30. In this case, the data processing device 20 may transmit some of the control signals via the control logic circuit to the memory device 30.

Figure 2:
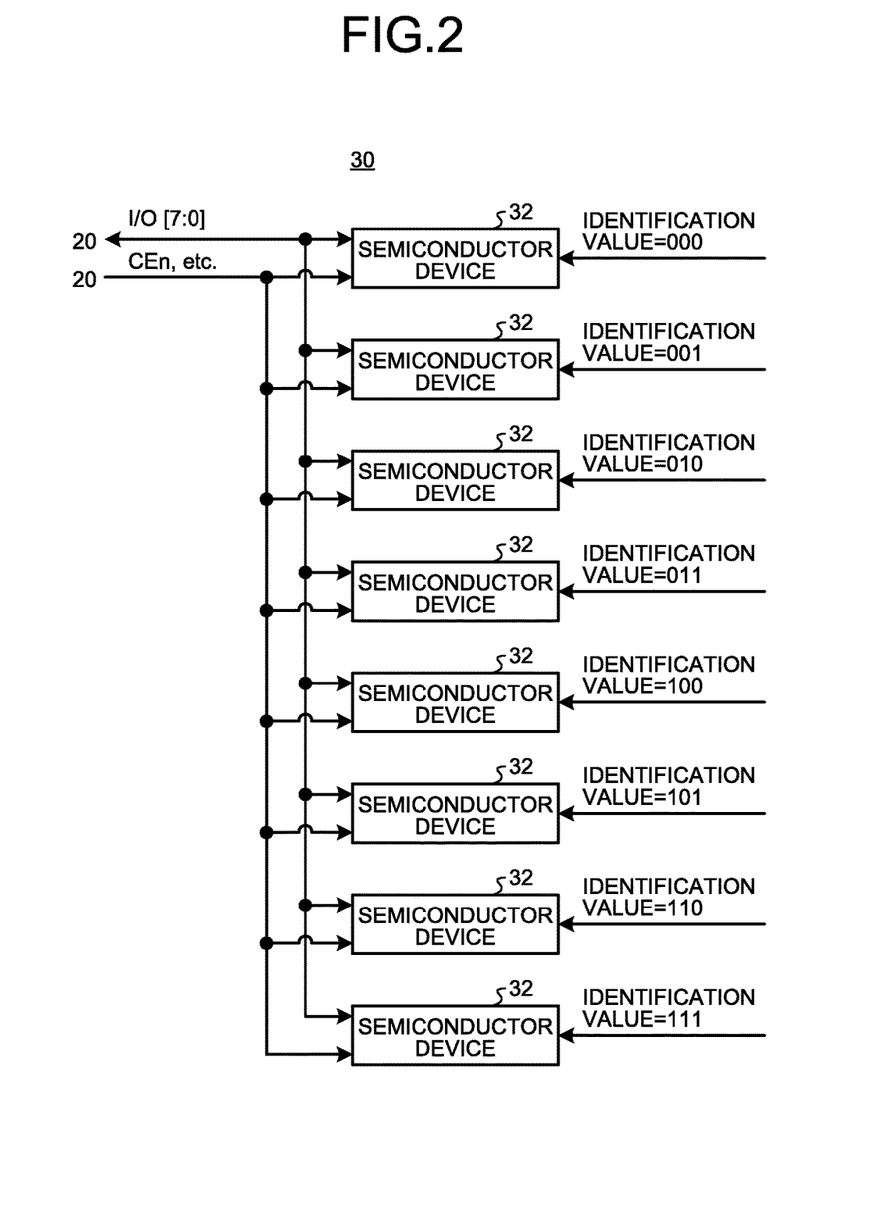
FIG. 2 is a block diagram illustrating the configuration of a memory device.

FIG. 2 is a block diagram illustrating the configuration of the memory device 30.

The memory device 30 includes one or more semiconductor devices 32. In FIG. 2, the memory device 30 includes eight semiconductor devices 32, but the number of semiconductor devices 32 included in the memory device 30 is not limited to eight.

The one or more semiconductor devices 32 are the same type of semiconductor chips. The one or more semiconductor devices 32 are packaged to be treated as one device. If the memory device 30 has a plurality of semiconductor devices 32, the plurality of semiconductor devices 32 may be stacked and packaged or laterally arranged and packaged.

The one or more semiconductor devices 32 are connected in common to the bus (I/O[7:0]) over which commands and data are transmitted. Thus, all of the one or more semiconductor devices 32 can receive commands and data transmitted from the data processing device 20. And the data processing device 20 can receive data from all of the one or more semiconductor devices 32. The one or more semiconductor devices 32 receive various control signals transmitted from the data processing device 20 in common.

Different identification values are assigned to the one or more semiconductor devices 32. Each of the one or more semiconductor devices 32 receives a signal indicating an identification value assigned to itself. For example, if the memory device 30 has eight semiconductor devices 32, each of the one or more semiconductor devices 32 receives an identification value of three bits.

Figure 3:
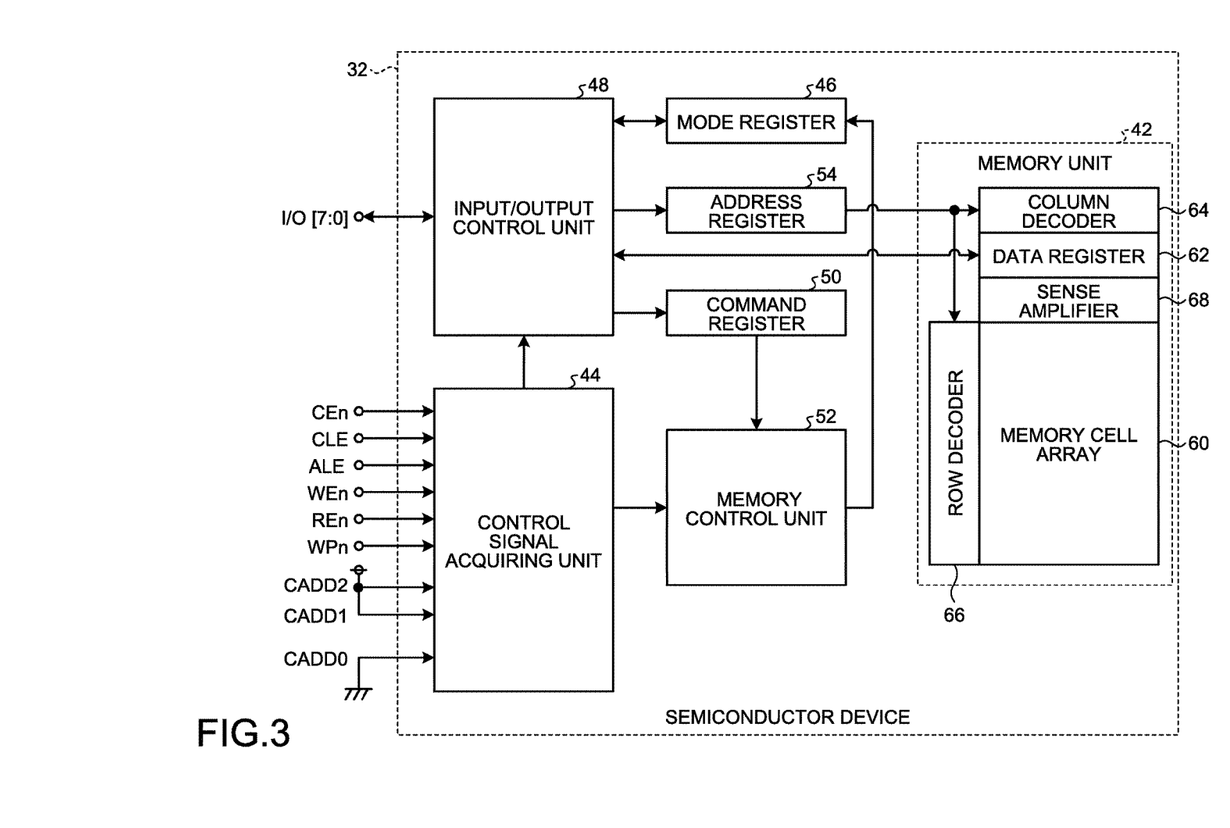
FIG. 3 is a block diagram illustrating the configuration of a semiconductor device.

FIG. 3 is a block diagram illustrating the configuration of the semiconductor device 32.

Each of the one or more semiconductor devices 32 includes circuits having functions as shown in FIG. 3. Each of the one or more semiconductor devices 32 includes a memory unit 42, a control signal acquiring unit 44, a mode register 46, an input/output control unit 48, a command register 50, a memory control unit 52, and an address register 54.

The memory unit 42 stores data. In this example, the memory unit 42 is nonvolatile. Not being limited to being nonvolatile, the memory unit 42 may be volatile.

The memory unit 42 includes a memory cell array 60, a data register 62, a column decoder 64, a row decoder 66, and a sense amplifier 68.

The memory cell array 60 includes multiple memory cells arranged in a matrix. Each of the memory cells is connected to one of multiple bit lines and one of multiple word lines. In the memory cell array 60, by selecting one bit line and one word line, one memory cell is selected.

The memory cell includes, for example, a resistance change element. The resistance change element is connected between a corresponding bit line and a corresponding word line. When a predetermined voltage is applied, the resistance change element switches between a high resistance state and a low resistance state. The memory cell stores binary data by switching the resistance change element between these resistance states. Note that the memory cell may include another type of element that can store data instead of the resistance change element.

The data register 62 temporarily stores data acquired from the data processing device 20 in writing. The data register 62 temporarily stores data read from the memory cell array 60 in reading.

The column decoder 64 selects the bit lines connected to memory cells to be accessed based on address information acquired from the data processing device 20. The row decoder 66 selects the word line connected to the memory cells to be accessed based on address information acquired from the data processing device 20. The column decoder 64 and the row decoder 66 write data stored in the data register 62 into the memory cells connected to the selected bit lines and word line in writing.

The sense amplifier 68 reads data from the memory cells connected to the bit lines and word line selected by the column decoder 64 and the row decoder 66 in reading. Then the sense amplifier 68 writes the data read from the memory cells into the data register 62 in reading.

The control signal acquiring unit 44 acquires various control signals transmitted from the data processing device 20. For example, the control signal acquiring unit 44 acquires the chip enable signal (CEn), command latch enable signal (CLE), address latch enable signal (ALE), write enable signal (WEn), read enable signal (REn), and write protect signal (WPn). The control signal acquiring unit 44 may acquire control signals other than these from the data processing device 20. The control signal acquiring unit 44 gives the acquired control signals to the input/output control unit 48 and the memory control unit 52.

The control signal acquiring unit 44 acquires a setting value assigned to itself via a setting value input terminal. Then the control signal acquiring unit 44 gives an acquired identification value to the input/output control unit 48 and the memory control unit 52.

For example, the setting value input terminal of the semiconductor device 32 is connected to a power supply line or a ground line depending on the setting value in manufacturing. Thus, the control signal acquiring unit 44 can acquire the setting value assigned to itself.

In this example, the semiconductor device 32 includes a CADD0 terminal, a CADD1 terminal, and a CADD2 terminal. And, in the example of FIG. 3, the CADD0 terminal is connected to a ground line; the CADD1 terminal is connected to a power supply line; and the CADD2 terminal is connected to the power supply line. Thus, an identification value of "011" (CADD0=0, CADD1=1, CADD2=1) is assigned to the semiconductor device 32 of FIG. 3. Note that other identification values are assigned to the other semiconductor devices 32.

The mode register 46 stores various setting values. The data processing device 20 can rewrite the various setting values stored in the mode register 46. The setting information stored in the mode register 46 may be initially set to predetermined values at the time of factory shipment.

The input/output control unit 48 is connected to the data processing device 20 via the bus (I/O[7:0]). The input/output control unit 48 acquires a command, data, and address information from the data processing device 20 via the bus at timings identified by the various control signals acquired by the control signal acquiring unit 44. Then the input/output control unit 48 accesses the memory unit 42 according to the acquired command, data, and address information. In this case, the input/output control unit 48 operates according to the various setting values stored in the mode register 46.

For example, the input/output control unit 48 writes the command acquired from the data processing device 20 into the command register 50. Further, the input/output control unit 48 writes the address information acquired from the data processing device 20 into the address register 54. In writing, the input/output control unit 48 writes the data acquired from the data processing device 20 into the data register 62 in the memory unit 42. In reading, the input/output control unit 48 reads data from the data register 62 in the memory unit 42 to transmit to the data processing device 20 via the bus.

The address register 54 stores the address information acquired by the input/output control unit 48. The address information stored in the address register 54 is read into the column decoder 64 and the row decoder 66 in the memory unit 42.

The command register 50 stores the command acquired by the input/output control unit 48. The command stored in the command register 50 is read by the memory control unit 52.

The memory control unit 52 controls the operation of the entire semiconductor device 32 according to the command stored in the command register 50. When receiving a command (mode register write command) to instruct to write a setting value into the mode register 46, the memory control unit 52 writes the setting value specified by the received command into the mode register 46 at a specified address. By this means, the memory control unit 52 can switch the operation mode or the like of the input/output control unit 48 according to the instruction from the data processing device 20.

Figure 4:
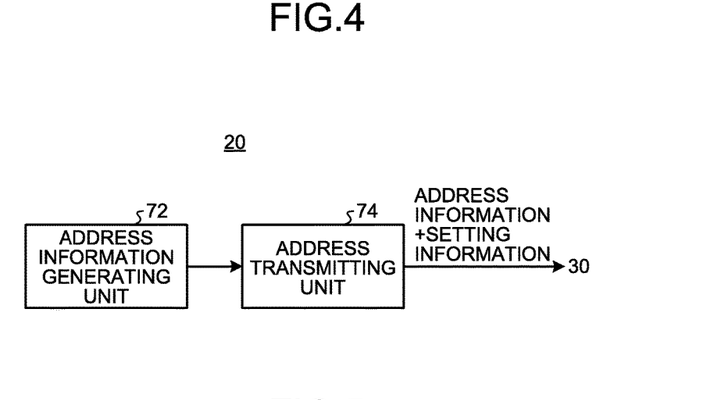
FIG. 4 is a block diagram illustrating the function of transmitting address information, in a data processing device.

FIG. 4 is a block diagram illustrating the function of transmitting address information, in the data processing device 20. The data processing device 20 includes an address information generating unit 72 and an address transmitting unit 74 as the function for transmitting address information.

In writing or reading data into or from the memory device 30, the address information generating unit 72 generates address information including a memory address and a chip address. The memory address is information designating an area to be accessed in the memory unit 42. The memory units 42 each included in one of the one or more semiconductor devices 32 have a common address space. Thus, the data processing device 20 can access the memory units 42 each included in one of the one or more semiconductor devices 32 in a common way.

The chip address is information designating one semiconductor device 32 to be accessed from among the one or more semiconductor devices 32. By this means, the data processing device 20 can access only any one designated semiconductor device 32 when the memory device 30 is configured to include a plurality of semiconductor devices 32.

When the memory device 30 includes only one semiconductor device 32 (a single chip), the data processing device 20 can switch between transmitting address information including a memory address and a chip address and transmitting address information including a memory address but not a chip address. The address information generating unit 72 generates address information including a memory address and a chip address or address information including a memory address but not a chip address depending on a set mode.

The address transmitting unit 74 divides the address information generated by the address information generating unit 72 into multiple cycles to transmit to the bus. For example, the address transmitting unit 74, after transmitting a command, transmits address information designating the area to access by that command.

When transmitting address information including a memory address and a chip address, the address transmitting unit 74 divides the address information into a first cycle number of cycles to transmit. In contrast, when transmitting address information including a memory address but not a chip address, the address transmitting unit 74 divides the address information into a second cycle number of cycles to transmit, the second cycle number being smaller than the first cycle number. Thus, when transmitting address information not including a chip address, the address transmitting unit 74 can transmit the address information with a smaller number of cycles than when transmitting address information including a chip address.

Further, the address transmitting unit 74 transmits setting information in one of the cycles, where address information is included. The setting information indicates whether address information of the first cycle number or address information of the second cycle number is transmitted. When transmitting address information of the first cycle number (e.g., address information including a chip address), the data processing device 20 transmits setting information set to a first value (e.g., 1). When transmitting address information of the second cycle number (e.g., address information not including a chip address), the data processing device 20 transmits setting information set to a second value (e.g., 0).

Then the input/output control unit 48 included in each of the one or more semiconductor devices 32 switches the number of cycles in which address information is to be acquired, according to the setting information acquired from the data processing device 20. Specifically, when the setting information indicates the first value (e.g., 1), the input/output control unit 48 acquires address information of the first cycle number. When the setting information indicates the first value (e.g., 1), the input/output control unit 48 acquires address information including, e.g., a memory address and a chip address.

When the setting information indicates the second value (e.g., 0), the input/output control unit 48 acquires address information of the second cycle number. When the setting information indicates the second value (e.g., 0), the input/output control unit 48 acquires address information including, e.g., a memory address but not a chip address.

When the memory device 30 includes a predetermined number of, two or more, semiconductor devices 32, the data processing device 20 can switch between transmitting address information including a memory address and a chip address of a first bit width and transmitting address information including a memory address and a chip address of a second bit width smaller than the first bit width. For example, when the memory device 30 includes two semiconductor devices 32, the data processing device 20 can switch between transmitting address information including a memory address and a chip address of three bits and transmitting address information including a memory address and a chip address of one bit.

When transmitting address information including a memory address and a chip address of the first bit width, the address transmitting unit 74 divides the address information into the first cycle number of cycles to transmit. In contrast, when transmitting address information including a memory address and a chip address of the second bit width, the address transmitting unit 74 divides the address information into the second cycle number of cycles to transmit, the second cycle number being smaller than the first cycle number. Thus, when transmitting address information including a chip address of a smaller bit width, the address transmitting unit 74 can transmit the address information with a smaller number of cycles than when transmitting address information including a chip address of a larger bit width.

Further, when transmitting address information of the first cycle number (e.g., address information including a chip address of the first bit width), the data processing device 20 transmits setting information set to the first value (e.g., 1). When transmitting address information of the second cycle number (e.g., address information including a chip address of the second bit width), the data processing device 20 transmits setting information set to the second value (e.g., 0).

Then when the setting information indicates the first value (e.g., 1), the input/output control unit 48 acquires address information including, e.g., a memory address and a chip address of the first bit width. When the setting information indicates the second value (e.g., 0), the input/output control unit 48 acquires address information including, e.g., a memory address and a chip address of the second bit width.

Figure 5:
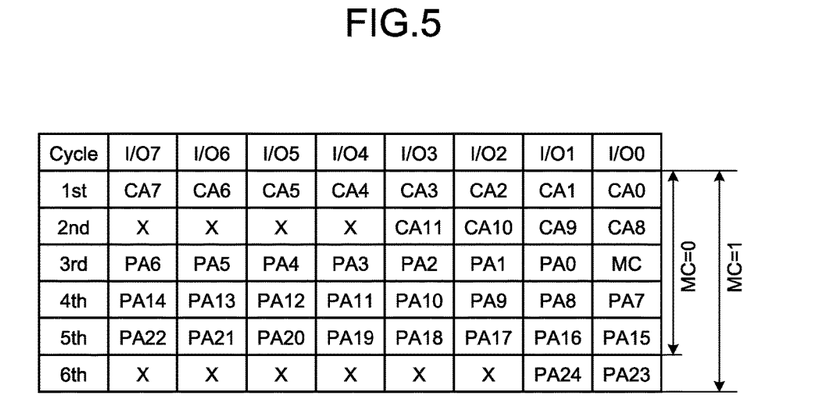
FIG. 5 is a diagram illustrating example address information in a first embodiment.

FIG. 5 is a diagram illustrating example address information in the first embodiment. The data processing device 20 transmits, for example, a column address of 12 bits (CA0 to CA11) and a page address of 25 bits (PA0 to PA24) as the address information.

In this example, the memory unit 42 is divided into multiple pages. Each of the multiple pages is divided into multiple columns.

The column address of 12 bits (CA0 to CA11) is information designating a column to be accessed in the memory unit 42. A page address of low 22 bits (PA0 to PA21) out of the 25 bits is information designating a page to be accessed in the memory unit 42. Thus, in the present example, the column address of 12 bits (CA0 to CA11) and the page address of low 22 bits (PA0 to PA21) correspond to the memory address designating an area to be accessed in the memory unit 42.

A page address of high three bits (PA22 to PA24) out of the 25 bits is information designating one semiconductor device 32 to be accessed from among the plurality of semiconductor devices 32 incorporated in the memory device 30. Thus, in the present example, the page address of high three bits (PA22 to PA24) corresponds to the chip address.

If the memory device 30 includes one semiconductor device 32 (a single chip), and if transmitting address information including a chip address, the data processing device 20 divides the address information into six cycles to transmit.

In this case, specifically, the data processing device 20 transmits a column address of the first to eighth bits (CA0 to CA7) in the first cycle. The data processing device 20 transmits a column address of the ninth to twelfth bits (CA8 to CA11) in the second cycle. The data processing device 20 transmits a page address of the first to seventh bits (PA0 to PA6) in the third cycle. The data processing device 20 transmits a page address of the eighth to fifteenth bits (PA7 to PA14) in the fourth cycle. The data processing device 20 transmits a page address of the sixteenth to twenty-third bits (PA15 to PA22) in the fifth cycle. The data processing device 20 transmits a page address of the twenty-fourth to twenty-fifth bits (PA23 to PA24) in the sixth cycle.

If the memory device 30 includes one semiconductor device 32 (a single chip), and if transmitting address information not including a chip address, the data processing device 20 divides the address information into five cycles to transmit. In this case, specifically, the data processing device 20 transmits over the first to fourth cycles the same information as if transmitting address information including a chip address. The data processing device 20 transmits a page address of the sixteenth to twenty-second bits (PA15 to PA21) in the fifth cycle.

If the memory device 30 includes a predetermined number of, two or more (herein two), semiconductor devices 32, and if transmitting address information including a chip address of the first bit width (herein a three bit width), the data processing device 20 divides the address information into six cycles to transmit. In this case, specifically, the data processing device 20 transmits over the first to sixth cycles the same information as if the memory device 30 includes one semiconductor device 32 (a single chip) and if the data processing device 20 transmits address information including a chip address.

If the memory device 30 includes a predetermined number of, two or more (herein two), semiconductor devices 32, and if transmitting address information including a chip address of the second bit width (herein a one bit width), the data processing device 20 divides the address information into five cycles to transmit. In this case, specifically, the data processing device 20 transmits over the first to fourth cycles the same information as if the memory device 30 includes one semiconductor device 32 (a single chip) and if the data processing device 20 transmits address information including a chip address. Then the data processing device 20 transmits a page address of the sixteenth to twenty-third bits (PA15 to PA22) in the fifth cycle.

Further, the data processing device 20 transmits setting information (MC) as well in a cycle in which address information is transmitted. For example, if the memory device 30 includes only one semiconductor device 32 (a single chip), and if transmitting address information including a chip address, the data processing device 20 transmits setting information MC set equal to the first value (e.g., 1). For example, if the memory device 30 includes one semiconductor device 32 (a single chip), and if transmitting address information not including a chip address, the data processing device 20 transmits setting information MC set equal to the second value (e.g., 0).

For example, if the memory device 30 includes a predetermined number of (herein two) semiconductor devices 32, and if transmitting address information including a chip address of the first bit width (herein a three bit width), the data processing device 20 transmits setting information MC set equal to the first value (e.g., 1). For example, if the memory device 30 includes a predetermined number of (herein two) semiconductor devices 32, and if transmitting address information including a chip address of the second bit width (herein a one bit width), the data processing device 20 transmits setting information MC set equal to the second value (e.g., 0).

Note that the data processing device 20 transmits setting information in a cycle prior to the cycle in which a chip address is transmitted. In this example, the data processing device 20 transmits setting information (MC) in the third cycle. Thus, before acquiring a chip address (PA22 to PA24), the semiconductor device 32 can determine whether the chip address (PA22 to PA24) needs to be dealt with.

The data processing device 20 transmits at least part of the chip address in the last cycle of multiple cycles and does not transmit information other than the chip address in the last cycle. Thus, the data processing device 20 can make the arrangement (format) of information transmitted in cycles other than the last cycle be the same between when transmitting address information not including a chip address and when transmitting address information including a chip address. The semiconductor device 32 can perform the same process on the data piece of the same arrangement (format) between when receiving address information not including a chip address and when receiving address information including a chip address.

Figure 6:
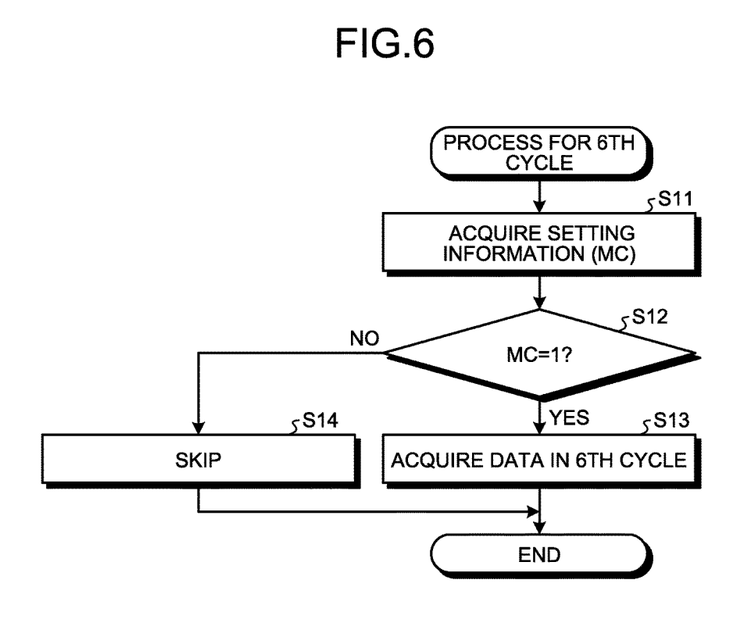
FIG. 6 is a flow chart illustrating the determination process of whether an input/output control unit is to deal with a sixth cycle.

FIG. 6 is a flow chart illustrating the determination process of whether the input/output control unit 48 is to deal with the sixth cycle. When receiving address information from the data processing device 20, the input/output control unit 48 in the memory device 30 performs the process shown in FIG. 6 before dealing with the sixth cycle.

First, the input/output control unit 48 acquires setting information (MC) at S11. Then at S12 the input/output control unit 48 determines whether the setting information is the first value (MC=1). If the setting information is the first value (MC=1) (Yes at S12), the input/output control unit 48 performs the acquisition process for data in the sixth cycle at S13. Then after performing the acquisition process for data in the sixth cycle, the input/output control unit 48 ends the acquisition process for address information.

In contrast, if the setting information is not the first value (MC≠1) (No at S12), the input/output control unit 48 skips the acquisition process for data in the sixth cycle at S14 and ends the acquisition process for address information. After performing the acquisition process for data in the first to fifth cycles, the input/output control unit 48 ends the acquisition process.

By performing the above process, the input/output control unit 48 can switch the number of cycles in which address information is to be acquired, according to the setting information acquired from the data processing device 20. Specifically, if the setting information indicates the first value (MC=1), the input/output control unit 48 can acquire address information of the first cycle number (six cycles, the first to sixth cycles). For example, if the memory device 30 includes one semiconductor device 32 (a single chip), and the setting information indicates the first value (MC=1), the input/output control unit 48 can acquire address information including a memory address and a chip address. For example, if the memory device 30 includes a predetermined number of, two or more (e.g., two), semiconductor devices 32, and the setting information indicates the first value (MC=1), the input/output control unit 48 can acquire address information including a memory address and a chip address of the first bit width (e.g., three bits).

If the setting information indicates the second value (MC=0), the input/output control unit 48 can acquire address information of the second cycle number (five cycles, the first to fifth cycles). For example, if the memory device 30 includes one semiconductor device 32 (a single chip), and the setting information indicates the second value (MC=0), the input/output control unit 48 can acquire address information including a memory address but not a chip address. For example, if the memory device 30 includes a predetermined number of, two or more (e.g., two), semiconductor devices 32, and the setting information indicates the second value (MC=0), the input/output control unit 48 can acquire address information including a memory address and a chip address of the second bit width (e.g., one bit).

Figure 7:
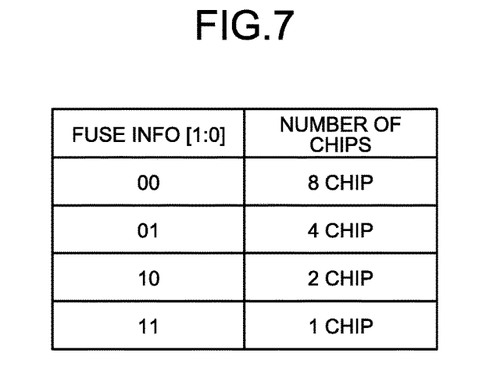
FIG. 7 is a diagram illustrating example Fuse information settings.

FIG. 7 is a diagram illustrating example Fuse information settings. The memory device 30 stores Fuse information. The Fuse information indicates the number of incorporated semiconductor devices 32 (the number of chips).

For example, the Fuse information is written into each semiconductor device 32 at the time of factory shipment. The Fuse information is, for example, two bits of information. In this example, the Fuse information indicates whether the number of them (the number of chips) incorporated in the memory device 30 is one (one chip), two (two chips), four (four chips), or eight (eight chips).

Figure 8:
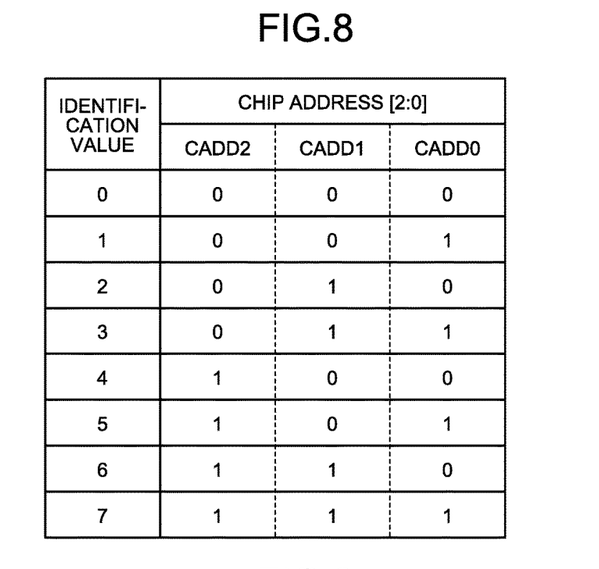
FIG. 8 is a diagram illustrating example identification values assigned to semiconductor devices.

FIG. 8 is a diagram illustrating example identification values assigned to semiconductor devices 32. A unique identification value is assigned to each of the one or more semiconductor devices 32 incorporated in the memory device 30. As identification values, 0, 1, 2, 3, 4, 5, 6, and 7 are assigned to eight semiconductor devices 32 incorporated in the memory device 30.

By connecting a predetermined setting-value input terminal to a power supply line or a ground line, an assigned identification value is given to the semiconductor device 32. For example, by connecting CADD0, CADD1, and CADD2 terminals to a power supply line or a ground line, an identification value is given to the semiconductor device 32.

When receiving address information, the input/output control unit 48 included in each of the plurality of semiconductor devices 32 acquires the chip address included in the address information. If the memory device 30 comprises a plurality of semiconductor devices 32, the input/output control unit 48 compares the chip address included in the address information with the assigned identification value. Then if the memory device 30 comprises a plurality of semiconductor devices 32, the input/output control unit 48 accesses the area in the memory unit 42 designated by the memory address included in the address information on condition that the chip address and the identification value coincide.

If the memory device 30 comprises one semiconductor device 32, the input/output control unit 48, without comparing the chip address included in the address information with the identification value, accesses the area in the memory unit 42 designated by the memory address included in the address information.

Figure 9:
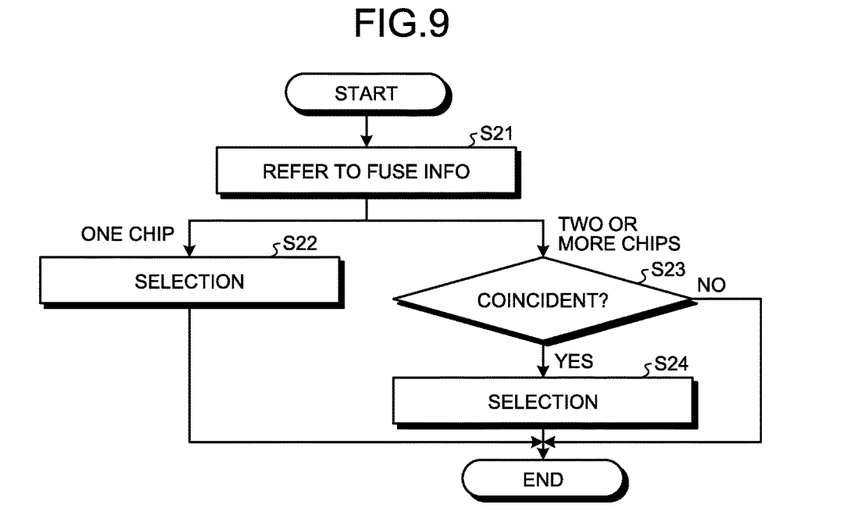
FIG. 9 is a flow chart illustrating the process for chip selection.

FIG. 9 is a flow chart illustrating the process for chip selection. When receiving address information from the data processing device 20, the input/output control unit 48 performs the process as shown in, e.g., FIG. 9.

When receiving address information, first the input/output control unit 48 refers to the Fuse information at S21. Then the input/output control unit 48 detects the number of semiconductor devices 32 incorporated in the memory device 30 based on the Fuse information.

If one semiconductor device 32 is incorporated in the memory device 30, the input/output control unit 48 causes the process to proceed to S22. At S22, the input/output control unit 48 determines that itself has been selected to be accessed and accesses the location in the memory unit 42 designated by the memory address. Thus, if the memory device 30 comprises one semiconductor device 32, the input/output control unit 48, without comparing the chip address included in the address information with the identification value, can access the area in the memory unit 42 designated by the memory address included in the address information. Then after finishing the processing at S22, the input/output control unit 48 ends this flow.

If two or more semiconductor devices 32 are incorporated in the memory device 30, the input/output control unit 48 causes the process to proceed to S23. At S23, the input/output control unit 48 compares the chip address and the identification value to see whether they coincide.

For example, if two semiconductor devices 32 are incorporated in the memory device 30, at S23 the input/output control unit 48 compares the first bit (e.g., PA22) of the chip address and the first bit (e.g., CADD0) of the identification value. If four semiconductor devices 32 are incorporated in the memory device 30, at S23 the input/output control unit 48 compares the first and second bits (e.g., PA22 and PA23) of the chip address and the first and second bits (e.g., CADD0 and CADD1) of the identification value. If eight semiconductor devices 32 are incorporated in the memory device 30, at S23 the input/output control unit 48 compares the first to third bits (e.g., PA22 to PA24) of the chip address and the first to third bits (e.g., CADD0 to CADD2) of the identification value.

If the chip address and the identification value coincide (Yes at S23), at S24 the input/output control unit 48 determines that itself has been selected to be accessed and accesses the location in the memory unit 42 designated by the memory address. Thus, if the memory device 30 comprises a plurality of semiconductor devices 32, the input/output control unit 48 can access the area in the memory unit 42 designated by the memory address included in the address information on condition that the chip address and the identification value coincide. Then after finishing the processing at S24, the input/output control unit 48 ends this flow.

If the chip address and the identification value do not coincide (No at S23), the input/output control unit 48 determines that itself has not been selected to be accessed and ends this flow without performing any processing.

As such, the data processing device 20 according to the first embodiment divides address information including a memory address and a chip address into the first cycle number of (e.g., six) cycles to transmit and divides address information including a memory address but not a chip address into the second cycle number of (e.g., five) cycles to transmit. Further, the data processing device 20 transmits the setting information indicating whether address information including a chip address or address information not including a chip address is transmitted, as well in a cycle in which address information is transmitted.

Then each of one or more semiconductor devices 32 incorporated in the memory device 30 according to the first embodiment switches the number of cycles in which address information is to be acquired, according to the setting information acquired from the data processing device 20. Thus, when receiving address information not including a chip address, the memory device 30 according to the first embodiment does not need to perform the process for acquiring a chip address. Therefore, the memory device 30 according to the first embodiment can efficiently deal with address information without a wasteful process in acquiring the address information.

Second Embodiment

Next, an information processing device 10 according to a second embodiment will be described. The information processing device 10 according to the second embodiment has substantially the same configuration and functions as the information processing device 10 according to the first embodiment. In the description of the second embodiment, the same reference numerals are used to denote the units having substantially the same functions and configurations as those described in the first embodiment, with detailed description thereof being omitted except for differences.

Figure 10:
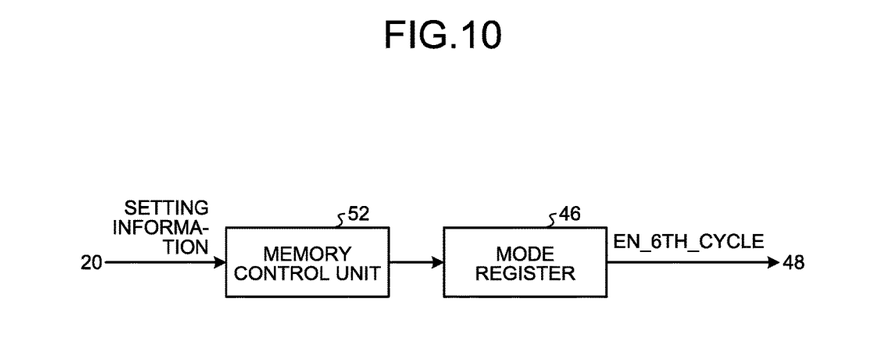
FIG. 10 is a diagram illustrating a memory control unit and a mode register in the semiconductor device.

FIG. 10 is a diagram illustrating a memory control unit 52 and a mode register 46 in the semiconductor device 32. In the second embodiment, the data processing device 20 causes the mode register 46 in the semiconductor device 32 to store the setting information before transmitting address information, instead of transmitting the setting information in a cycle in which address information is transmitted. Specifically, the data processing device 20 issues a mode-register write command to the memory device 30 so as to cause it to store the setting information into the mode register 46 at a predetermined address.

For example, if the memory device 30 includes one semiconductor device 32 (a single chip), and if transmitting address information including a memory address and a chip address, the data processing device 20 causes the mode register 46 to store the setting information indicating the first value (here, e.g., 1). If the memory device 30 includes one semiconductor device 32 (a single chip), and if transmitting address information including a memory address but not a chip address, the data processing device 20 causes the mode register 46 to store the setting information indicating the second value (here, e.g., 0).

For example, if the memory device 30 includes a predetermined number of, two or more (e.g., two), semiconductor devices 32, and if transmitting address information including a memory address and a chip address of the first bit width (e.g., a three bit width), the data processing device 20 causes the mode register 46 to store the setting information indicating the first value (here, e.g., 1). For example, if the memory device 30 includes a predetermined number of, two or more (e.g., two), semiconductor devices 32, and if transmitting address information including a memory address and a chip address of the second bit width (e.g., a one bit width), the data processing device 20 causes the mode register 46 to store the setting information indicating the second value (here, e.g., 0).

When receiving the mode-register write command and the setting information, the memory control unit 52 included in each of the one or more semiconductor devices 32 writes the received setting information into the mode register 46 at a predetermined address. When the setting information indicating the first value (here, e.g., 1) is written, the mode register 46 outputs a selection signal indicating "1" (EN_6TH_CYCLE=1) to the input/output control unit 48. When the setting information indicating the second value (here, e.g., 0) is written, the mode register 46 outputs the selection signal indicating "0" (EN_6TH_CYCLE=0) to the input/output control unit 48.

Figure 11:
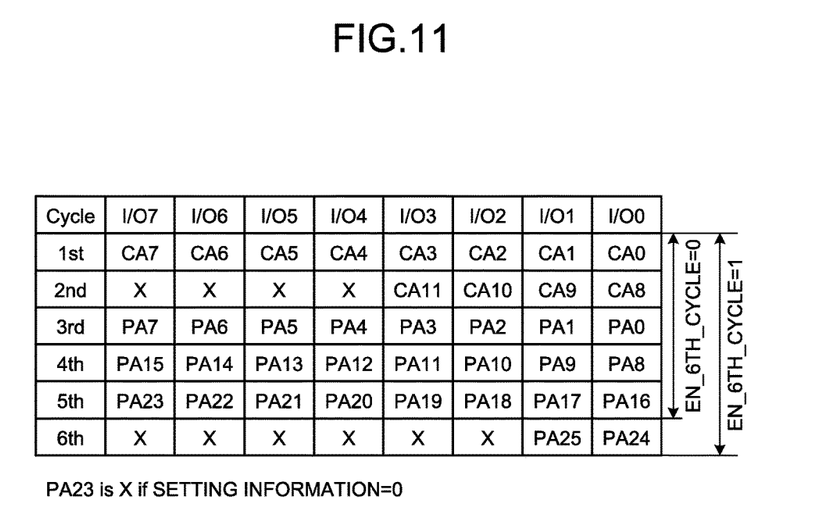
FIG. 11 is a diagram illustrating example address information in a second embodiment.

FIG. 11 is a diagram illustrating example address information in the second embodiment. In the second embodiment, the data processing device 20 transmits address information not including the setting information to the memory device 30.

For example, if the memory device 30 includes one semiconductor device 32 (a single chip), the data processing device 20 divides address information including a chip address into six cycles to transmit without the setting information. Specifically, the data processing device 20 transmits a column address of the first to eighth bits (CA0 to CA7) in the first cycle. The data processing device 20 transmits a column address of the ninth to twelfth bits (CA8 to CA11) in the second cycle. The data processing device 20 transmits a page address of the first to eighth bits (PA0 to PA7) in the third cycle. The data processing device 20 transmits a page address of the ninth to sixteenth bits (PA8 to PA15) in the fourth cycle. The data processing device 20 transmits a page address of the seventeenth to twenty-fourth bits (PA16 to PA23) in the fifth cycle. The data processing device 20 transmits a page address of the twenty-fifth to twenty-sixth bits (PA24 to PA25) in the sixth cycle.

If the memory device 30 includes one semiconductor device 32 (a single chip), the data processing device 20 divides address information not including a chip address into five cycles to transmit without the setting information. In this case, specifically, the data processing device 20 transmits over the first to fourth cycles the same information as if transmitting address information including a chip address. The data processing device 20 transmits a page address of the seventeenth to twenty-third bits (PA16 to PA22) in the fifth cycle.

For example, if the memory device 30 includes two semiconductor devices 32, the data processing device 20 divides address information including a chip address of the first bit width (e.g., three bits) into six cycles to transmit without the setting information. Specifically, the data processing device 20 transmits in the same way as if the memory device 30 includes one semiconductor device 32 (a single chip) and if the data processing device 20 transmits address information including a chip address.

For example, if the memory device 30 includes two semiconductor devices 32, the data processing device 20 divides address information including a chip address of the second bit width (e.g., one bit) into five cycles to transmit without the setting information. Specifically, the data processing device 20 transmits over the first to fourth cycles the same information as if the memory device 30 includes one semiconductor device 32 (a single chip) and if the data processing device 20 transmits address information including a chip address. Then the data processing device 20 transmits a page address of the seventeenth to twenty-fourth bits (PA16 to PA23) in the fifth cycle.

Then in the second embodiment, if the selection signal (EN_6TH_CYCLE) indicates "1", the input/output control unit 48 performs the process of acquiring data in the sixth cycle. That is, if the selection signal (EN_6TH_CYCLE) indicates "1", after performing the process of acquiring data in the sixth cycle, the input/output control unit 48 ends the process of acquiring address information.

In contrast, if the selection signal (EN_6TH_CYCLE) indicates "0", the input/output control unit 48 does not perform the process of acquiring data in the sixth cycle. That is, if the selection signal (EN_6TH_CYCLE) indicates "0", after performing the process of acquiring data in the fifth cycle, the input/output control unit 48 ends the process of acquiring address information.

As such, if the memory device 30 includes one semiconductor device 32 (a single chip), the data processing device 20 according to the second embodiment causes the mode register 46 of each of one or more semiconductor devices 32 incorporated in the memory device 30 to store the setting information indicating whether to transmit address information including a chip address or address information not including a chip address. If the memory device 30 includes a predetermined number of, two or more (e.g., two), semiconductor devices 32, the data processing device 20 according to the second embodiment causes the mode register 46 of each of a plurality of semiconductor devices 32 incorporated in the memory device 30 to store the setting information indicating whether to transmit address information including a chip address of the first bit width or address information including a chip address of the second bit width.

Then each of one or more semiconductor devices 32 incorporated in the memory device 30 according to the second embodiment switches the number of cycles in which address information is to be acquired, according to the setting information stored in the mode register 46. Thus, if the memory device 30 includes one semiconductor device 32 (a single chip), when receiving address information not including a chip address, the memory device 30 according to the second embodiment does not need to perform the process for acquiring a chip address. If the memory device 30 includes a predetermined number of, two or more (e.g., two), semiconductor devices 32, when receiving address information including a chip address of the second bit width, the memory device 30 according to the second embodiment does not need to perform the process for acquiring unnecessary bits. Therefore, the memory device 30 according to the second embodiment can efficiently deal with address information without a wasteful process in acquiring the address information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   one or more semiconductor devices connected in common to a bus, wherein
   each of the one or more semiconductor devices includes:
      a memory unit to store data; and
      an input/output control unit configured to acquire address information from a data processing device via the bus and access the memory unit according to the acquired address information,
   the data processing device is configured to divide the address information into a plurality of cycles to transmit to the bus, and
   the input/output control unit is configured to switch a number of cycles in which the address information is to be acquired, according to setting information acquired from the data processing device.

2. The memory device according to claim 1, wherein the input/output control unit is configured to:
   if the setting information indicates a first value, acquire the address information of a first cycle number; and
   if the setting information indicates a second value, acquire the address information of a second cycle number smaller than the first cycle number.

3. The memory device according to claim 2, wherein
   the memory unit included in each of the one or more semiconductor devices has a common address space,
   the address information includes a memory address designating an area to be accessed in the memory unit and a chip address designating one semiconductor device to be accessed from among the one or more semiconductor devices, and
   the input/output control unit is configured to:
      if the setting information indicates the first value, acquire the address information including the memory address and the chip address; and
      if the setting information indicates the second value, acquire the address information including the memory address but not the chip address.

4. The memory device according to claim 2, wherein
the memory unit included in each of the one or more semiconductor devices has a common address space,
the address information includes a memory address designating an area to be accessed in the memory unit and a chip address designating one semiconductor device to be accessed from among the one or more semiconductor devices,
the input/output control unit is configured to:
  if the setting information indicates the first value, acquire the address information including the memory address and the chip address of a first bit width; and
  if the setting information indicates the second value, acquire the address information including the memory address and the chip address of a second bit width smaller than the first bit width.

5. The memory device according to claim 3, wherein
different identification values are assigned to the one or more semiconductor devices, and
the input/output control unit is configured to, if the memory device comprises a plurality of semiconductor devices, compare the chip address included in the address information with the assigned identification value and access an area in the memory unit designated by the memory address included in the address information on condition that the chip address and the identification value coincide.

6. The memory device according to claim 4, wherein at least part of the chip address is included in the last cycle from among a plurality of cycles in which the address information is included.

7. The memory device according to claim 3, wherein
the setting information is included in a cycle in which the address information is included, and
the input/output control unit is configured to switch the number of cycles in which the address information is to be acquired, according to the setting information included in the address information.

8. The memory device according to claim 7, wherein the setting information is included in a cycle before a cycle in which the chip address is included.

9. The memory device according to claim 1, wherein
each of the one or more semiconductor devices further includes:
  a mode register to store the setting information; and
  a memory control unit configured to rewrite the setting information stored in the mode register, according to a command acquired from the data processing device, and
the input/output control unit is configured to switch the number of cycles in which the address information is to be acquired, according to the setting information stored in the mode register.

10. The memory device according to claim 9, wherein the setting information stored in the mode register is initially set to a predetermined value at the time of factory shipment.

11. A data processing device to write and read data into and from a memory device including one or more semiconductor devices connected in common to a bus, the data processing device comprising:
an address information generating unit configured to generate address information including a chip address designating one semiconductor device to be accessed from among the one or more semiconductor devices, or address information not including the chip address, depending on a set mode; and
an address transmitting unit configured to divide the address information into a plurality of cycles to transmit to the memory device via the bus,
wherein the address transmitting unit is configured to divide address information including the chip address into a first cycle number of cycles to transmit, and divides address information not including the chip address into a second cycle number of cycles to transmit, the second cycle number being smaller than the first cycle number.

12. The data processing device according to claim 11, wherein the address transmitting unit is configured to transmit setting information indicating whether address information including the chip address or address information not including the chip address is transmitted, in a cycle in which the address information is transmitted.

13. A data processing device to write and read data into and from a memory device including two or more semiconductor devices connected in common to a bus, the data processing device comprising:
an address information generating unit configured to generate address information including a chip address designating one semiconductor device to be accessed from among the two or more semiconductor devices, according to a set mode; and
an address transmitting unit configured to divide the address information into a plurality of cycles to transmit to the memory device via the bus, wherein
the address information generating unit is configured to generate the address information including the chip address of a first bit width or the address information including the chip address of a second bit width smaller than the first bit width, and
the address transmitting unit is configured to divide address information including the chip address of the first bit width into a first cycle number of cycles to transmit, and divide address information including the chip address of the second bit width into a second cycle number of cycles to transmit, the second cycle number being smaller than the first cycle number.

14. The data processing device according to claim 13, wherein the address transmitting unit is configured to transmit setting information indicating whether address information including the chip address of the first bit width or address information including the chip address of the second bit width is transmitted, in a cycle in which the address information is transmitted.

\* \* \* \* \*